J. B. GATHRIGHT.
AUTOMATIC CAR BRAKE.
No. 10,744. Reissued July 6, 1886.
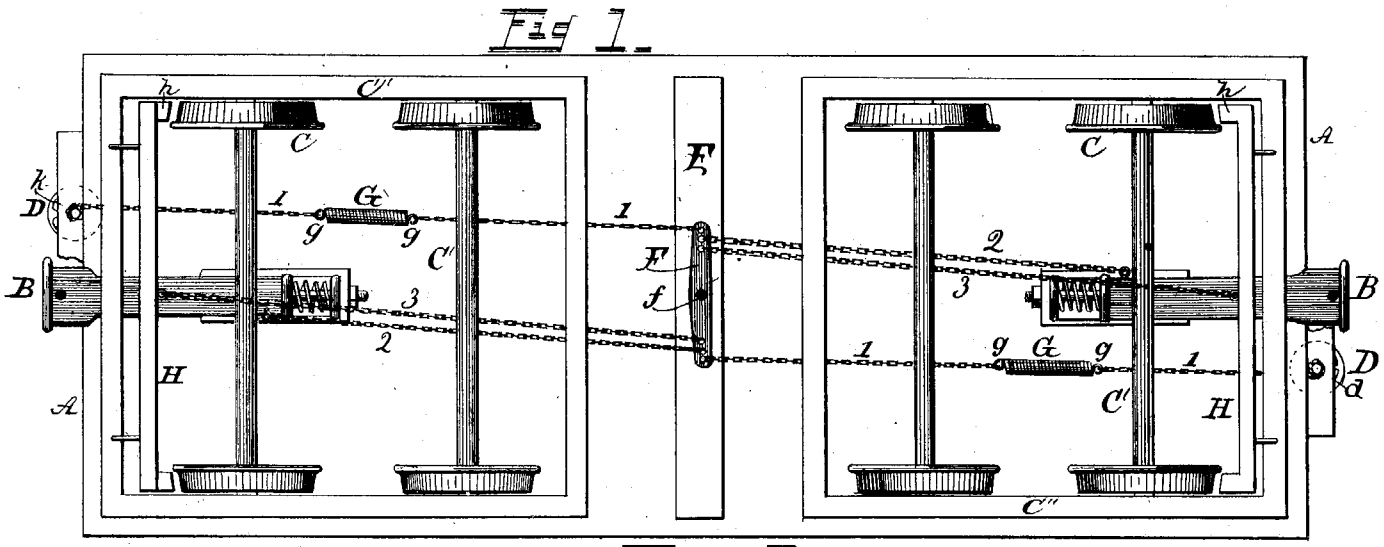
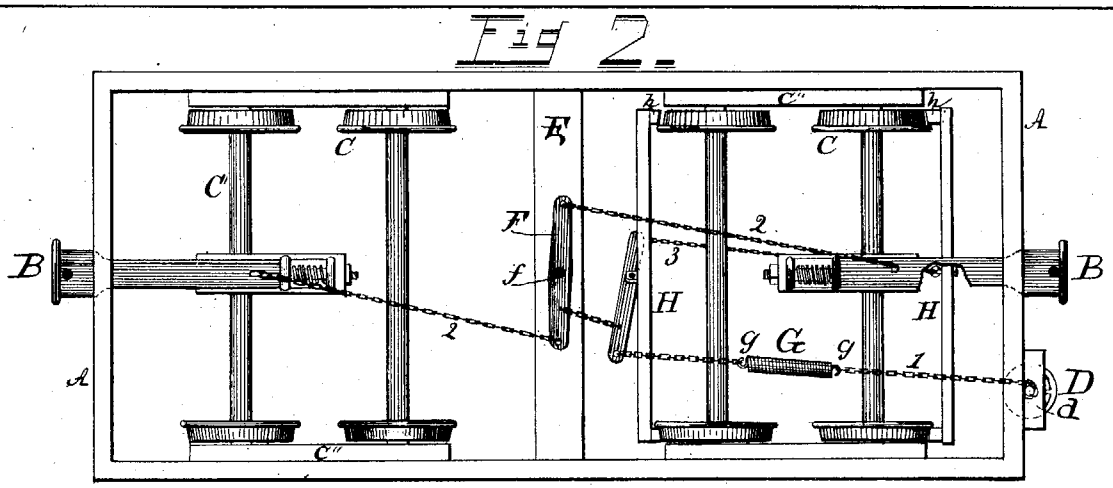
Witnesses
G. E. Tucker
Van Buren Hillyard
Inventor.
Josiah B. Gathright.
per W. C. Stevens. Atty.
N. PETERS, Photo-Lithographer, Washington, D. C.

UNITED STATES PATENT OFFICE.

JOSIAH B. GATHRIGHT, OF LOUISVILLE, KENTUCKY.

AUTOMATIC CAR-BRAKE.

SPECIFICATION forming part of Reissued Letters Patent No. 10,744, dated July 6, 1886.

Original No. 323,659, dated August 4, 1885. Application for reissue filed February 12, 1886. Serial No. 191,729.

*To all whom it may concern:*

Be it known that I, JOSIAH B. GATHRIGHT, a citizen of the United States, residing at Louisville, in the county of Jefferson and State of Kentucky, have invented certain new and useful Improvements in Automatic Car-Brakes, of which the following is a specification.

Heretofore automatic car-brakes have usually been designed to act upon the wheels when impelled by the force of the car's momentum operating thereon through the medium of the receding draw-head. Thus when the engine slacks its speed it offers resistance to the momentum of the forward car through the draw-head, pushing the draw-head in and applying the brake with a force equal to the car's momentum. In a similar manner each car, on slackening its speed, acts on its successor, the brakes all being applied by force acting on them through the backward thrust of the draw-heads, and if the draw-heads are not forcibly pushed in the brakes will not be applied. If one car or a number of cars were to be broken loose from the engine while ascending a steep grade and run backward down the grade, the brakes would not be automatically applied to the wheels until the rear car of the train met with sufficient resistance to push in a draw-head, when it would be too late to be of service.

The object of my invention is to provide a simple means for storing up force through the medium of the common hand-brake wheels, and to provide connections with the brakes and draw-heads, whereby the brakes will be applied by the said stored-up force when the draw-heads recede, whether such receding is caused by the momentum of the cars meeting opposition through the draw-heads or by the said force withdrawing the draw-heads when the latter are set free by a car or train of cars breaking loose from the engine.

To this end my invention consists in the construction and combination of parts forming an automatic car-brake, hereinafter described and claimed, reference being had to the accompanying drawings, in which—

Figure 1 is an inverted plan view of a car, showing one form of my invention adapted to operate brakes on both trucks thereof; and Fig. 2 represents a modification of the same in which the brake is adapted to act on the wheels of only one truck of the car.

A represents the body of the car; B, the draw-heads; C, the wheels; C′, the axles, and C″ the truck-frames in which the axles are journaled.

H represents the brake-beams, hung to swing as usual, and provided with shoes *h*, to bear as brakes on the wheels when required.

F represents a lever pivoted to a portion, E, of the car-body at *f*, and connected with the brake-beams H by means of chains 3, and with the common hand-brake wheel and stem D *d* by a chain, 1. The stem *d* is provided, as usual, with a ratchet and pawl, whereby it may be rigidly held after the chain 1 is wound up to apply the brake. I interpose a spring, G, somewhere in the line of connections between the brake-shoes *h* and the hand-wheel D, and I connect the chain 1 with the draw-heads B by some means, such as the chain 2, whereby the extending or drawing out of the draw-heads will lengthen the connecting line between the brake-shoes *h* and the wheel D by extending spring G, and release the brakes, while the said wheel D remains set. I have here shown the spring G arranged to resist extension by being connected with the chain 1 by hooks *g*. When the brake-chains are wound up and set by the wheel D, force is stored up in the springs G, which acts continually to draw in the draw-heads, and whenever the said draw-heads are pushed in the springs will be applied to the brakes regardless of and in no way affected by the amount of force with which the draw-heads are pushed in. If the speed of the engine is slackened enough to permit the draw-heads to be retracted, the brakes will begin to be applied. If it slackens more, so that the draw-heads are free to be fully retracted or are actually pushed in, the full force of the springs will act to apply the brakes; but whenever the engine pulls the draw-heads out the brakes will be released and the brake force will again be stored up in the springs for future use. Acting on this principle it is evident that if a car breaks loose from the train, the force of draft upon the draw-heads being removed, the draw-heads will be retracted by the springs G and the brakes will thereby be applied, quickly stopping the car.

One modification is shown in Fig. 2, in which a second lever is interposed to act in conjunction with the lever F, but producing practically the same effect, acting, however, only on one brake.

A distinguishing feature of my invention is that winding up the brake-chain with the hand-wheel applies the brakes by straining an intermediate spring, whereby the brakes will remain applied until the draw-head, by extending, releases the brakes by further straining the spring, but straining it in the direction opposite to the hand-wheel, and force thus stored up in the said strained spring will repeatedly apply the brakes until the spring is set free by the hand-wheel.

Having thus fully described my invention, what I claim, and desire to secure by Letters Patent, is—

1. In an automatic car-brake, an ordinary hand wheel and axle, a pawl and ratchet therefor, ordinary brakes hung to the car to act upon the wheels, chains or similar devices connecting the brakes with the said hand-wheel and axle, a spring interposed in the said connecting-chain, and other chains connecting one or both draw-heads of the car with the beforementioned connecting-chain at that end of the spring opposed to the hand-wheel, substantially as shown and described, whereby force may be applied through the hand-wheel and stored up in the spring to act upon the brakes when permitted to do so by the receding of the draw-head, and whereby the said draw-head in advancing will release the brakes and restore force to the spring, as set forth.

2. The combination of ordinary brakes for a car, an ordinary hand brake-wheel, a retainer therefor, a chain of connections between the said brakes and hand-wheel, a spring forming one link in the said chain, and a connection between the said spring and a draw-head of the car in opposition to the connections between the said spring and hand-wheel, substantially as shown and described, whereby the advance of the draw-head will forcibly lengthen the chain and release the brakes when they have been applied by hand, as set forth.

3. The combination of ordinary brakes for a car, an ordinary hand brake-wheel, retainers therefor, a chain of connections between the said brakes and hand-wheel, ordinary sliding draw-heads, a chain of connections between the draw-heads and the said brake-chain, and a spring or equivalent means of storing force located in the brake-chain between the point of attachment thereto of the draw-head chain, and the hand-wheel, substantially as shown and described, whereby force applied to the hand-wheel may be stored for operating the brake an indefinite number of times, as set forth.

JOSIAH B. GATHRIGHT.

Witnesses:
WALTER WALKER,
GEO. W. BRADEN.